United States Patent
Dee

(10) Patent No.: US 12,206,666 B2
(45) Date of Patent: *Jan. 21, 2025

(54) SYSTEMS AND METHODS FOR HOSTED AUTHENTICATION SERVICE

(71) Applicant: Worldpay Limited, London (GB)

(72) Inventor: Christopher S. Dee, Stapleford (GB)

(73) Assignee: Worldpay Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,169

(22) Filed: Nov. 30, 2023

(65) Prior Publication Data

US 2024/0098087 A1  Mar. 21, 2024

Related U.S. Application Data

(63) Continuation of application No. 17/537,324, filed on Nov. 29, 2021, now Pat. No. 11,909,736, which is a
(Continued)

(51) Int. Cl.
*H04L 9/40* (2022.01)
*G06F 9/455* (2018.01)
(Continued)

(52) U.S. Cl.
CPC ...... *H04L 63/0884* (2013.01); *G06F 9/45529* (2013.01); *G06F 21/31* (2013.01);
(Continued)

(58) Field of Classification Search
CPC ............ H04L 63/0884; H04L 9/3226; H04L 2463/082; H04L 2463/102; H04L 63/083; H04L 63/0861; H04L 2209/56; H04L 9/3271; G06F 9/45529; G06F 21/31; G06F 2221/2103; G06F 21/34; G06F 21/44;
(Continued)

(56) References Cited

U.S. PATENT DOCUMENTS 5,931,917 A * 8/1999 Nguyen .................. G06Q 20/12
709/216
5,987,140 A  11/1999 Rowney et al.
(Continued)

*Primary Examiner* — Aravind K Moorthy
(74) *Attorney, Agent, or Firm* — Bookoff McAndrews, PLLC

(57) ABSTRACT

Systems and methods for authenticating an electronic transaction using a hosted authentication service. The systems and methods determine whether an authentication is required based on a first electronic message received from a first data system. Upon determining the authentication is required, the systems and methods transmit a dummy authentication request and a hosted authentication service uniform resource locator to the first data system. The systems and methods further determine or receive an indication whether a user authentication challenge is required based on a transaction risk analysis by a second data system. Upon determining the user authentication challenge is required, the systems and methods provide, at a user interface, an electronic form including a challenge request. The systems and methods transmit, to the first data system, another electronic form including a dummy authentication response generated based on a challenge result.

20 Claims, 6 Drawing Sheets

Related U.S. Application Data continuation of application No. 16/743,030, filed on Jan. 15, 2020, now Pat. No. 11,271,933.

(51) Int. Cl.
  *G06F 21/31* (2013.01)
  *G06Q 20/40* (2012.01)
  *H04L 9/32* (2006.01)

(52) U.S. Cl.
  CPC ......... *G06Q 20/401* (2013.01); *H04L 9/3226* (2013.01); *G06F 2221/2103* (2013.01); *G06Q 2220/00* (2013.01)

(58) Field of Classification Search
  CPC .. G06Q 20/401; G06Q 2220/00; G06Q 20/10; G06Q 20/12; G06Q 20/20; G06Q 20/3825; G06Q 20/4014; G06Q 20/4016; G06Q 20/405
  See application file for complete search history.

(56) References Cited

U.S. PATENT DOCUMENTS

| | | | |
|---|---|---|---|
| 6,032,194 A | 2/2000 | Gai et al. | |
| 6,418,436 B1* | 7/2002 | Degen | G06Q 20/4016 |
| 6,895,510 B1* | 5/2005 | Benantar | H04L 63/0869 |
| | | | 726/9 |
| 7,013,326 B1 | 3/2006 | Suzuki et al. | |
| 7,162,035 B1* | 1/2007 | Durst | G06F 21/602 |
| | | | 380/54 |
| 7,263,716 B1 | 8/2007 | Gulick | |
| 7,337,119 B1* | 2/2008 | Geschwender | G06Q 40/00 |
| | | | 705/44 |
| 7,991,939 B1* | 8/2011 | Tsu | G06F 1/3287 |
| | | | 713/320 |
| 8,510,572 B2* | 8/2013 | Kato | G06F 21/34 |
| | | | 713/193 |
| 8,555,344 B1* | 10/2013 | Wiedmann | H04L 63/0876 |
| | | | 713/168 |
| 9,083,583 B1* | 7/2015 | Roskind | H04L 67/5681 |
| 9,088,894 B1 | 7/2015 | Kaushik et al. | |
| 9,218,610 B2 | 12/2015 | Kandregula | |
| 9,401,914 B1 | 7/2016 | Jiang et al. | |
| 9,521,142 B2* | 12/2016 | Xavier | G06F 21/46 |
| 10,127,372 B2* | 11/2018 | Gupta | G06F 21/36 |
| 10,163,107 B1 | 12/2018 | White et al. | |
| 10,492,071 B1 | 11/2019 | Adiga et al. | |
| 10,698,794 B1* | 6/2020 | Ganesan | H04L 67/34 |
| 10,713,190 B1* | 7/2020 | Arbel | G06F 12/0862 |
| 10,771,498 B1 | 9/2020 | Tamhane et al. | |
| 11,057,429 B1 | 7/2021 | Sellers | |
| 11,211,140 B1 | 12/2021 | Satpathy | |
| 11,271,933 B1* | 3/2022 | Dee | G06F 21/31 |
| 11,558,365 B1* | 1/2023 | McCorkendale | H04L 63/083 |
| 11,909,736 B2* | 2/2024 | Dee | G06F 21/31 |
| 2002/0042841 A1 | 4/2002 | Nishio et al. | |
| 2002/0065973 A1 | 5/2002 | Holfelner | |
| 2002/0120853 A1 | 8/2002 | Tyree | |
| 2002/0159481 A1 | 10/2002 | Takatori et al. | |
| 2003/0069981 A1* | 4/2003 | Trovato | H04L 63/04 |
| | | | 709/228 |
| 2004/0002902 A1* | 1/2004 | Muehlhaeuser | H04M 3/493 |
| | | | 705/26.1 |
| 2004/0205114 A1 | 10/2004 | Kinoshita | |
| 2004/0255126 A1 | 12/2004 | Reith | |
| 2005/0021781 A1 | 1/2005 | Sunder et al. | |
| 2005/0122209 A1* | 6/2005 | Black | G06Q 20/4014 |
| | | | 340/5.4 |
| 2005/0204292 A1 | 9/2005 | Kibilov et al. | |
| 2006/0031576 A1 | 2/2006 | Canright | |
| 2006/0123092 A1 | 6/2006 | Madams et al. | |
| 2006/0253454 A1 | 11/2006 | Coppola et al. | |
| 2006/0282528 A1 | 12/2006 | Madams et al. | |
| 2007/0083444 A1 | 4/2007 | Matthews et al. | |
| 2007/0086369 A1 | 4/2007 | Tang | |
| 2007/0181670 A1* | 8/2007 | Donovan | G06Q 20/42 |
| | | | 235/379 |
| 2007/0197190 A1* | 8/2007 | Tang | H04W 36/0038 |
| | | | 455/410 |
| 2007/0220595 A1 | 9/2007 | M et al. | |
| 2008/0091824 A1 | 4/2008 | Patel et al. | |
| 2008/0107029 A1 | 5/2008 | Hall et al. | |
| 2008/0165951 A1* | 7/2008 | Somers | G06Q 10/0637 |
| | | | 380/2 |
| 2008/0189212 A1 | 8/2008 | Kulakowski et al. | |
| 2008/0222049 A1 | 9/2008 | Loomis et al. | |
| 2009/0055891 A1 | 2/2009 | Okamoto et al. | |
| 2009/0063334 A1* | 3/2009 | Duncan | G06Q 20/10 |
| | | | 705/39 |
| 2009/0106826 A1* | 4/2009 | Palestrant | H04L 63/08 |
| | | | 726/7 |
| 2009/0276839 A1* | 11/2009 | Peneder | G06F 21/31 |
| | | | 726/8 |
| 2009/0327411 A1 | 12/2009 | Dang et al. | |
| 2010/0074441 A1* | 3/2010 | Pauker | H04L 9/0625 |
| | | | 713/168 |
| 2010/0094612 A1 | 4/2010 | Weerasinghe | |
| 2010/0161508 A1 | 6/2010 | Planitzer et al. | |
| 2010/0274692 A1* | 10/2010 | Hammad | G06Q 20/12 |
| | | | 705/30 |
| 2010/0293189 A1* | 11/2010 | Hammad | G06Q 20/20 |
| | | | 707/769 |
| 2010/0327054 A1* | 12/2010 | Hammad | G06Q 20/40 |
| | | | 235/375 |
| 2010/0329112 A1 | 12/2010 | Ahn et al. | |
| 2011/0047608 A1 | 2/2011 | Levenberg | |
| 2011/0078774 A1* | 3/2011 | Grube | G06Q 20/401 |
| | | | 726/5 |
| 2011/0119602 A1 | 5/2011 | Isozu | |
| 2011/0145899 A1 | 6/2011 | Cao et al. | |
| 2011/0208866 A1* | 8/2011 | Marmolejo-Meillon | |
| | | | H04L 67/04 |
| | | | 709/227 |
| 2011/0219416 A1 | 9/2011 | Lindquist et al. | |
| 2011/0295988 A1* | 12/2011 | Le Jouan | G06F 21/31 |
| | | | 709/223 |
| 2012/0180119 A1 | 7/2012 | Bessis et al. | |
| 2012/0290491 A1 | 11/2012 | Rafferty et al. | |
| 2012/0317238 A1 | 12/2012 | Beard | |
| 2013/0019152 A1 | 1/2013 | Rau | |
| 2013/0019295 A1 | 1/2013 | Park et al. | |
| 2013/0085914 A1* | 4/2013 | McPherson | H04L 63/0823 |
| | | | 705/34 |
| 2013/0117252 A1 | 5/2013 | Samaddar et al. | |
| 2013/0136164 A1* | 5/2013 | Ronc | H04L 1/0054 |
| | | | 375/224 |
| 2013/0165077 A1* | 6/2013 | Aalla | H04W 12/122 |
| | | | 455/411 |
| 2013/0198801 A1 | 8/2013 | Nishizawa et al. | |
| 2013/0246714 A1 | 9/2013 | Lv et al. | |
| 2013/0265876 A1 | 10/2013 | Song et al. | |
| 2013/0276125 A1* | 10/2013 | Bailey | G06F 21/46 |
| | | | 726/25 |
| 2014/0046772 A1 | 2/2014 | Raman | |
| 2014/0108656 A1 | 4/2014 | Salinca et al. | |
| 2014/0110468 A1 | 4/2014 | Kandregula | |
| 2014/0201831 A1* | 7/2014 | Yi | G06F 21/31 |
| | | | 726/19 |
| 2015/0087427 A1* | 3/2015 | Wane | A63F 13/71 |
| | | | 463/43 |
| 2015/0106505 A1* | 4/2015 | Ramaswamy | H04N 21/2387 |
| | | | 709/224 |
| 2015/0106889 A1 | 4/2015 | Sharabani et al. | |
| 2015/0128242 A1 | 5/2015 | Hoy et al. | |
| 2015/0220718 A1 | 8/2015 | Hong et al. | |
| 2015/0264726 A1 | 9/2015 | Zhu et al. | |
| 2016/0055349 A1 | 2/2016 | Mashima et al. | |
| 2016/0092871 A1* | 3/2016 | Gordon | H04W 4/06 |
| | | | 705/44 |
| 2016/0098723 A1 | 4/2016 | Feeney | |

(56) References Cited

U.S. PATENT DOCUMENTS

| | | | |
|---|---|---|---|
| 2016/0098730 A1 | 4/2016 | Feeney | |
| 2016/0134599 A1 | 5/2016 | Ross et al. | |
| 2016/0140545 A1* | 5/2016 | Flurscheim | H04L 9/3234 705/76 |
| 2016/0156619 A1 | 6/2016 | Lovelock et al. | |
| 2016/0212111 A1* | 7/2016 | Yang | H04L 63/08 |
| 2016/0248742 A1 | 8/2016 | Baghdasaryan et al. | |
| 2016/0261478 A1 | 9/2016 | Navasivasakthivelsamy et al. | |
| 2016/0277380 A1 | 9/2016 | Wagner et al. | |
| 2016/0294793 A1* | 10/2016 | Larson | H04L 63/1408 |
| 2016/0323278 A1 | 11/2016 | Yang et al. | |
| 2016/0371496 A1 | 12/2016 | Sell et al. | |
| 2017/0054556 A1* | 2/2017 | Fu | H04L 9/0852 |
| 2017/0140159 A1 | 5/2017 | Melone et al. | |
| 2017/0161578 A1 | 6/2017 | Ivanisov et al. | |
| 2017/0221054 A1* | 8/2017 | Flurscheim | G06Q 20/3276 |
| 2017/0228730 A1 | 8/2017 | Ramirez | |
| 2017/0238175 A1* | 8/2017 | Miyazawa | H04W 12/065 726/6 |
| 2018/0007158 A1 | 1/2018 | Hack et al. | |
| 2018/0173871 A1* | 6/2018 | Toth | H04W 12/126 |
| 2018/0181932 A1* | 6/2018 | Lynch | G06Q 20/34 |
| 2018/0224989 A1* | 8/2018 | Deasy | G06F 3/0233 |
| 2018/0288575 A1 | 10/2018 | Lal et al. | |
| 2018/0343245 A1* | 11/2018 | Mizutani | H04L 63/0815 |
| 2018/0351936 A1 | 12/2018 | Battacharya et al. | |
| 2019/0042781 A1* | 2/2019 | Lukacs | G06F 21/56 |
| 2019/0065767 A1* | 2/2019 | Kominar | G06F 21/83 |
| 2019/0114635 A1* | 4/2019 | Gurunathan | G06Q 20/4014 |
| 2019/0141022 A1* | 5/2019 | Reeve | G06F 21/31 |
| 2019/0197501 A1 | 6/2019 | Senci et al. | |
| 2019/0303915 A1* | 10/2019 | Hammad | G06Q 20/12 |
| 2019/0325434 A1* | 10/2019 | Nandakumar | G06Q 20/3274 |
| 2019/0332451 A1 | 10/2019 | Tamjidi et al. | |
| 2019/0334884 A1 | 10/2019 | Ross et al. | |
| 2019/0340623 A1* | 11/2019 | Rivkind | G06F 21/31 |
| 2019/0349360 A1 | 11/2019 | Yeddula et al. | |
| 2020/0126355 A1* | 4/2020 | Yi | G06Q 20/40145 |
| 2020/0137213 A1* | 4/2020 | Kaladgi | H04L 63/10 |
| 2020/0151719 A1* | 5/2020 | Sarin | G06Q 20/208 |
| 2020/0177581 A1 | 6/2020 | Vijayaraghavan et al. | |
| 2020/0204541 A1 | 6/2020 | Nair et al. | |
| 2020/0301854 A1* | 9/2020 | Ramagiri | G06F 12/1441 |
| 2021/0058774 A1 | 2/2021 | Yang et al. | |
| 2021/0073400 A1 | 3/2021 | Shetty et al. | |
| 2021/0092603 A1 | 3/2021 | Yang et al. | |
| 2021/0119763 A1* | 4/2021 | Weiner | G06F 21/606 |
| 2021/0152982 A1 | 5/2021 | Agarwal et al. | |
| 2021/0182183 A1 | 6/2021 | Wan | |
| 2021/0203713 A1 | 7/2021 | Broddle et al. | |
| 2021/0217001 A1 | 7/2021 | Harrison | |
| 2022/0182822 A1 | 6/2022 | Ma | |

* cited by examiner

SYSTEMS AND METHODS FOR HOSTED AUTHENTICATION SERVICE

CROSS-REFERENCE TO RELATED APPLICATION(S)

This patent application is a continuation of and claims the benefit of priority to U.S. application Ser. No. 17/537,324, filed on Nov. 29, 2021, which is a continuation of U.S. application Ser. No. 16/743,030, filed on Jan. 15, 2020, now U.S. Pat. No. 11,271,933, the entireties of which are incorporated herein by reference.

FIELD OF DISCLOSURE

The present disclosure relates generally to the field of secure network transactions and, more particularly, to systems and methods for authenticating electronic transactions using a hosted authentication service.

BACKGROUND

Electronic transaction technologies have advanced to permit merchants and consumers to conveniently transact business over the Internet. However, the proliferation of online payment transactions has made sensitive and secure electronic data to become potentially vulnerable to data breaches (e.g., card-not-present (CNP) fraud). In a drive to reduce such data breaches, legislative governmental entities and payment schemes have mandated a new authentication requirement (e.g., Strong Customer Authentication (SCA)). Consequently, card schemes have adopted EMVCo's new specification (e.g., Three-Domain Secure 2 (3DS2)) in order to meet the new authentication requirement. The new 3DS2 specification builds on an earlier version of Three-Domain Secure specification (3DS1). 3DS1 requires shoppers to enter payment credentials (e.g., a password or a passcode) during electronic payment transactions, resulting in friction during the checkout process. Under 3DS2, enhanced authentication methods (e.g., multi-factor authentication, risk-based authentication, and frictionless authentication) may be performed by using additional consumer transaction data obtained during the checkout process. In order to provide the additional consumer transaction data in accordance with 3DS2, merchants who host their own payment form, whether or not they already use a third party 3DS requestor to initiate the 3DS protocol flow, may be required to modify their technical integration.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a method for authenticating an electronic transaction using a hosted data service, comprising: a method for authenticating an electronic transaction using a hosted data service, comprising: determining whether an authentication is required based on a first electronic message received from a first data system, upon determining the authentication is required, transmitting a dummy authentication request and a hosted authentication service (HAS) uniform resource locator (URL) to the first data system; receiving, from the first data system, a first electronic form generated based on the HAS URL, the first electronic form comprising a first data system return URL and the dummy authentication request; upon receiving the first electronic form, collecting user transaction data from the first data system for a transaction risk analysis by a second data system; determining or receiving an indication whether a user authentication challenge is required based on the transaction risk analysis; upon determining the user authentication challenge is required, providing, at a user interface, a second electronic form generated based on a second data system return URL, the second electronic form comprising a challenge request; receiving, from the second data system, a third electronic form generated based on the HAS URL, the third electronic form comprising a challenge result based on a user authentication credential; and transmitting, to the first data system, a fourth electronic form generated based on the first data system return URL, the fourth electronic form comprising a dummy authentication response generated based on the challenge result.

One embodiment provides a system for authenticating an electronic transaction using a hosted data service, comprising: a data storage device storing instructions for authenticating the electronic transaction with the hosted data service; and a processor configured to execute the instructions to perform a method comprising: determining whether an authentication is required based on a first electronic message received from a first data system, upon determining the authentication is required, transmitting a dummy authentication request and a hosted authentication service (HAS) uniform resource locator (URL) to the first data system; receiving, from the first data system, a first electronic form generated based on the HAS URL, the first electronic form comprising a first data system return URL and the dummy authentication request; upon receiving the first electronic form, collecting user transaction data from the first data system for a transaction risk analysis by a second data system; determining or receiving an indication whether a user authentication challenge is required based on the transaction risk analysis; upon determining the user authentication challenge is required, providing, at a user interface, a second electronic form generated based on a second data system return URL, the second electronic form comprising a challenge request; receiving, from the second data system, a third electronic form generated based on the HAS URL, the third electronic form comprising a challenge result based on a user authentication credential; and transmitting, to the first data system, a fourth electronic form generated based on the first data system return URL, the fourth electronic form comprising a dummy authentication response generated based on the challenge result.

One embodiment provides a non-transitory computer-readable medium storing instructions that, when executed by a transaction processor, causes the processor to perform a method for authenticating an electronic transaction using a hosted data service, the method comprising: determining whether an authentication is required based on a first electronic message received from a first data system, upon determining the authentication is required, transmitting a dummy authentication request and a hosted authentication service (HAS) uniform resource locator (URL) to the first data system; receiving, from the first data system, a first electronic form generated based on the HAS URL, the first electronic form comprising a first data system return URL and the dummy authentication request; upon receiving the first electronic form, collecting user transaction data from the first data system for a transaction risk analysis by a second data system; determining or receiving an indication whether a user authentication challenge is required based on the transaction risk analysis; upon determining the user authentication challenge is required, providing, at a user interface, a second electronic form generated based on a second data system return URL, the second electronic form comprising a challenge request; receiving, from the second data system, a third electronic form generated based on the HAS URL, the third electronic form comprising a challenge result based on a user authentication credential; and transmitting, to the first data system, a fourth electronic form generated based on the first data system return URL, the fourth electronic form comprising a dummy authentication response generated based on the challenge result.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
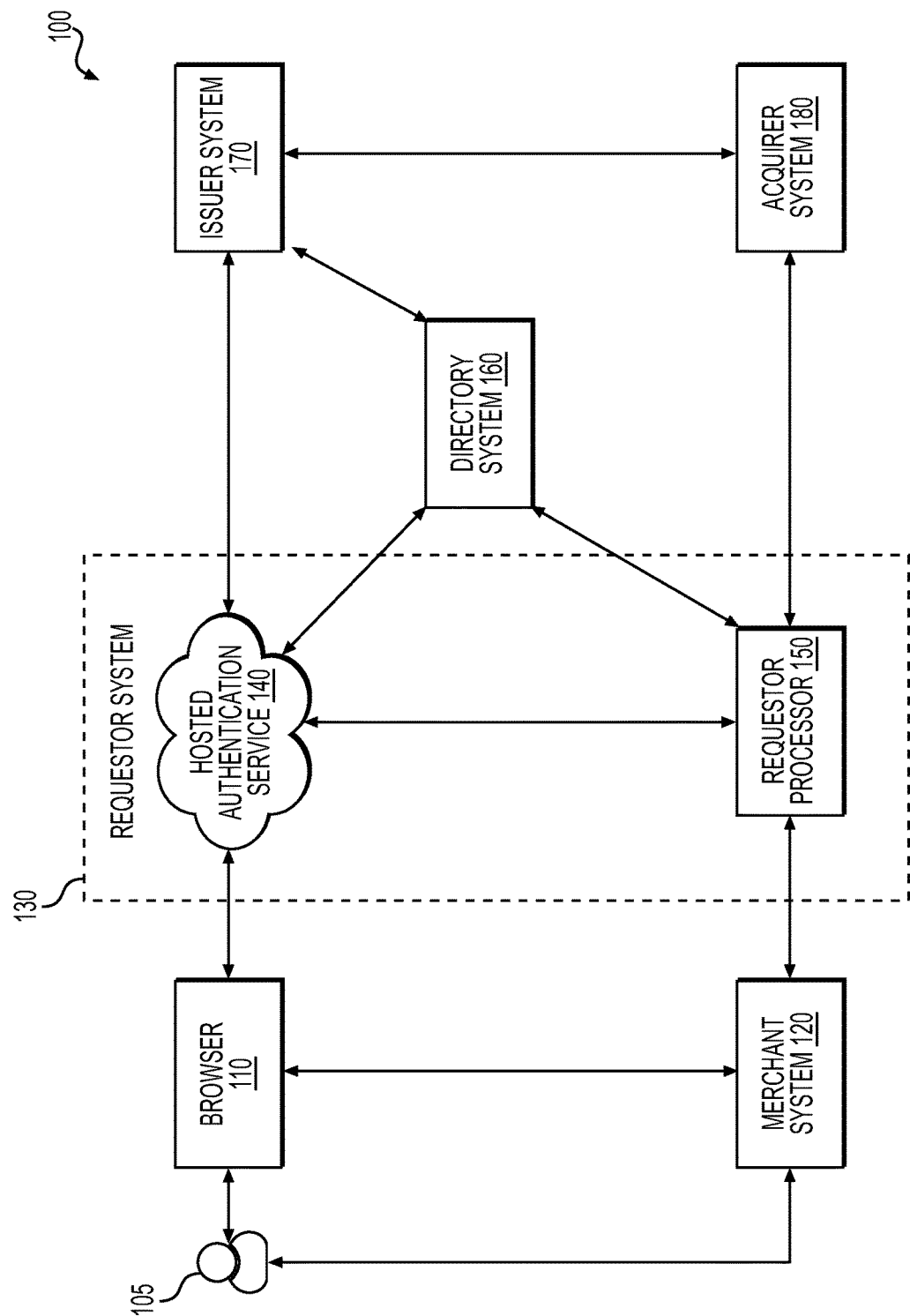
FIG. 1 depicts a block diagram of an exemplary electronic payment system, according to one aspect of the present disclosure.

The present disclosed embodiments will now be described in detail with reference to several examples thereof as illustrated in the accompanying drawings. In the following description, numerous specific details are set forth in order to provide a thorough understanding of embodiments of the present disclosure. It will be apparent, however, to one skilled in the art, that embodiments may be practiced without some or all of these specific details. In other instances, well known process steps and/or structures have not been described in detail in order to not unnecessarily obscure the present embodiments. The features and advantages of embodiments may be better understood with reference to the drawings and discussions that follow.

The following discussion relates to methods and systems for secure electronic transactions. Such methods and systems may enable merchants to securely process consumer payments, without having to integrate to new versions of transaction specifications.

The demand for secure electronic payment transactions will continue to rise, and the security requirement standard for electronic payment transactions will continue to strengthen as well. In order to meet the continuing demand for changes in security requirements (e.g., SCA) for preventing data security fraud (e.g., CNP and e-Commerce fraud), merchants may be required to continually re-integrate their systems in accordance with new versions of an existing specification(s) or protocol(s) (specification and protocol may be used interchangeably hereinafter). However, the merchants may face various problems with re-integrating their systems according to new versions of the security protocol (e.g., 3DS2). For example, the merchants may be required to provide new, additional data (e.g., browser user agent, browser time zone, shipping details, consumer Internet Protocol (IP) addresses, etc.) that may not have been required in the previous versions of security protocols. That is, the merchants may have to undertake costly new integrations with their payment service providers (PSPs). Especially, smaller merchants who do not have sufficient access to Information Technology (IT) functionality support may be severely impacted by the new integration requirements. Moreover, the merchants who fail to newly integrate their systems may not be able to accept e-Commerce purchases once the new integration requirement becomes effective.

However, for many merchants who have already integrated to an existing security specification or protocol (e.g., 3DS1), either directly with a PSP or via a shopping cart, a hosted authentication service contemplated in the present disclosure may allow the merchants to avoid re-integrating their systems altogether when moving from an existing security protocol (e.g., 3DS1) to subsequent new versions of security protocols (e.g., 3DS2). The hosted authentication service may thus prevent the merchants from incurring version integration and software upgrade costs. Moreover, the hosted authentication service may allow PSPs to manage the security protocol integration process, thereby ensuring that merchants meet new compliance requirements and deadlines.

To address the above-noted problems, the present disclosure contemplates a hosted authentication service that may allow merchants who wish to host their own payment form to continue to do so without the need for technical re-integration. That is, the hosted authentication service may perform the required payment transaction tasks (e.g., gathering and providing device data elements) for the merchants in accordance with any new security protocol version.

For example, when the hosted authentication service determines that additional tasks must be performed in accordance with the new security protocol version requirements, the hosted authentication service may generate a dummy message that mimics a message appropriate for the previous version of the security protocol. Further, the hosted authentication service may process the authentication data in accordance with the new security protocol without the merchants and the consumers being aware. That is, the hosted authentication service may perform all the required tasks and communicate messages between the merchants and the payment transaction systems without having the merchants newly integrate to the new security protocol.

It should be appreciated that particular consideration is made herein to credit card transactions due to the prevalence of these transactions. Despite this reference to credit cards, the disclosed systems and methods apply equally well to the transfer of any sensitive data, whether "card present" or "card-not-present" (CNP). Disclosed systems and methods may apply, for example, in online transactions where a user is not physically present at a merchant location. Transactions may include credit/debit transactions, gift card transactions, PayPal transactions, BitCoin transactions, smart card transactions, mobile application transactions, and the usage of loyalty cards, to name a few. Effectively, any circumstance where sensitive data, such as a primary account number (PAN), social security number, bank routing number, driver's license number, biometric data (e.g., fingerprint, iris scan, and etc.), etc., or token corresponding thereto, is being transmitted over a network, systems and methods disclosed herein may be employed. Further, while the party seeking to initiate a secure transaction may be referred to herein as a "merchant," a party seeking to initiate a secure transaction need not be a merchant, but may be a service provider, or any party seeking to execute a transaction.

Referring now to appended drawings, FIG. 1 depicts a block diagram of an exemplary electronic payment system 100, according to one aspect of the present disclosure. In the electronic payment system 100, a consumer 105 may utilize a payment vehicle to initiate a payment transaction with a merchant system 120. The consumer 105, such as a shopper or a purchaser, may initiate the payment transaction directly, such as at a POS terminal at a retail location, or remotely through a browser 110. The browser 110 may interact with the merchant system 120, and/or directly with the requestor system 130. The browser 110 may be a client-side browser on a user computing device, but may also be a client-side application on any other type of client-side data processor.

The merchant system 120 may comprise a data server hosting the merchant's e-Commerce store, a merchant point of sale (POS) system(s), and/or terminal(s). The merchant system 120 may collect the consumer's payment data, such as credit card information or other sensitive data. The merchant system 120 may then electronically transfer the payment data to a requestor system 130, along with an authorization request, in order to obtain the consumer payment authorization. The requestor system 130 may comprise a requestor processor 150 (e.g., a requestor gateway) and a hosted authentication service (HAS) 140 that route, transmit, and process the consumer payment transaction data. HAS 140 may be arranged separately from the requestor system 130, for example, on a cloud network, or maybe arranged as an integral part of the requestor processor 150. When the merchant system 120 receives a payment transaction request from the consumer 105, the merchant system 120 may transmit an authorization request (e.g., a payment authorization request) to the requestor processor 150. The requestor processor 150 (or HAS 140) may then communicate with the directory system 160, the issuer system 170, and/or the acquire system 180 for further processing of the payment transaction.

Although FIG. 1 illustrates the directory system 160, the issuer system 170, and the acquire system 180 for performing payment transactions, any number or appropriate type of systems may be utilized to perform the payment transactions. For example, an authentication orchestration system, authenticating authority, and/or any other processing system or entity may be utilized, singly or in combination, to communicate with the browser 110, the merchant system 120, and/or the requestor system 130 to perform payment transaction. Further, FIG. 1 shows one example system that is configured to perform payment transactions. However, the system may be configured to perform any electronic transaction related to user security and/or authentication.

When the requestor system 130 receives the authorization request, the requestor system 130 may transmit the authorization request and the payment data to an issuer system 170 (e.g., a consumer's bank and/or an issuer access control server) and/or an acquirer system 180 (e.g., a merchant's bank) to complete the payment transaction authorization. The requestor system 130 may be an intermediary in the electronic payment system 100 to ensure validity of a payment transaction request.

In one embodiment, once the merchant system 120 sends a payment authorization request message to the requestor processor 150 according to an existing version of the security protocol, the requestor processor 150 may communicate with the issuer system 170 to determine whether a consumer authentication is required. The requestor processor 150 may or may not communicate with the issuer system 170 or the directory system 160 to determine whether the consumer authentication is required. If the requestor processor 150 determines that the consumer authentication is not required, the requestor processor 150 may communicate with the acquirer system 180 and the issuer system 170 for payment authorization and return the result the authorization request to the merchant system 120 as a payment authorization response message.

However, if the requestor processor 150 determines that the consumer authentication is required, the requestor processor 150 may return an authentication request along with an issuer URL to the merchant system 120 in response to the payment authorization request. The merchant system 120 may then generate an HTML form based on the issuer URL, and include a merchant system return URL and the authentication request in the HTML form (e.g., by POSTing to the issuer URL). The consumer 105 may then authenticate with the issuer system 170, by providing authentication information in accordance with the instructions provided from the issuer system 170 at the issuer URL. Once the issuer system 170 receives the authentication information from the consumer 105, the issuer system 170 may generate an authentication response based on the consumer's authentication credentials. The authentication response may include a cryptogram for validating the payment authorization. The issuer system 170 may then generate an issuer HTML form based on the merchant system URL and include the authentication response in the issuer HTML form. Once the issuer HTML form lands on the merchant system return URL endpoint, the merchant system 120 may send another message with the authentication response to the requestor processor 150, cross-referencing the original payment authorization request message to the message with the authentication response.

Once the requestor processor 150 receives the message cross-referencing the original payment authorization request message with the authentication response, the requestor system 130 may proceed to authorize the payment with the acquirer system 180, by transmitting the issuer system-generated authentication response to the acquirer system 180. Subsequently, the acquirer system 180 may route the authentication response, as part of the authorization response, back to the issuer system 170, which may validate the authentication response, for example, based on the cryptogram included in the authentication response, and authorize the payment with an "authenticated" status. The requestor processor 150 may then receive the authorization response and authentication status data from the acquirer system 180, and respond to the original payment authorization request message based on the authorization response and/or authentication status data.

In another embodiment, a new security standard (e.g., SCA) may require the merchant system 120 to follow a new security protocol (e.g., 3DS2) for processing the consumer payment transaction. For example, the new security protocol may require the merchant system 120 to provide additional consumer payment transaction data in order to proceed with the consumer payment transaction process. The additional consumer payment transaction data may be browser user agent information, a browser time zone, a transaction history, and/or a consumer device identifier (ID).

Figure 2:
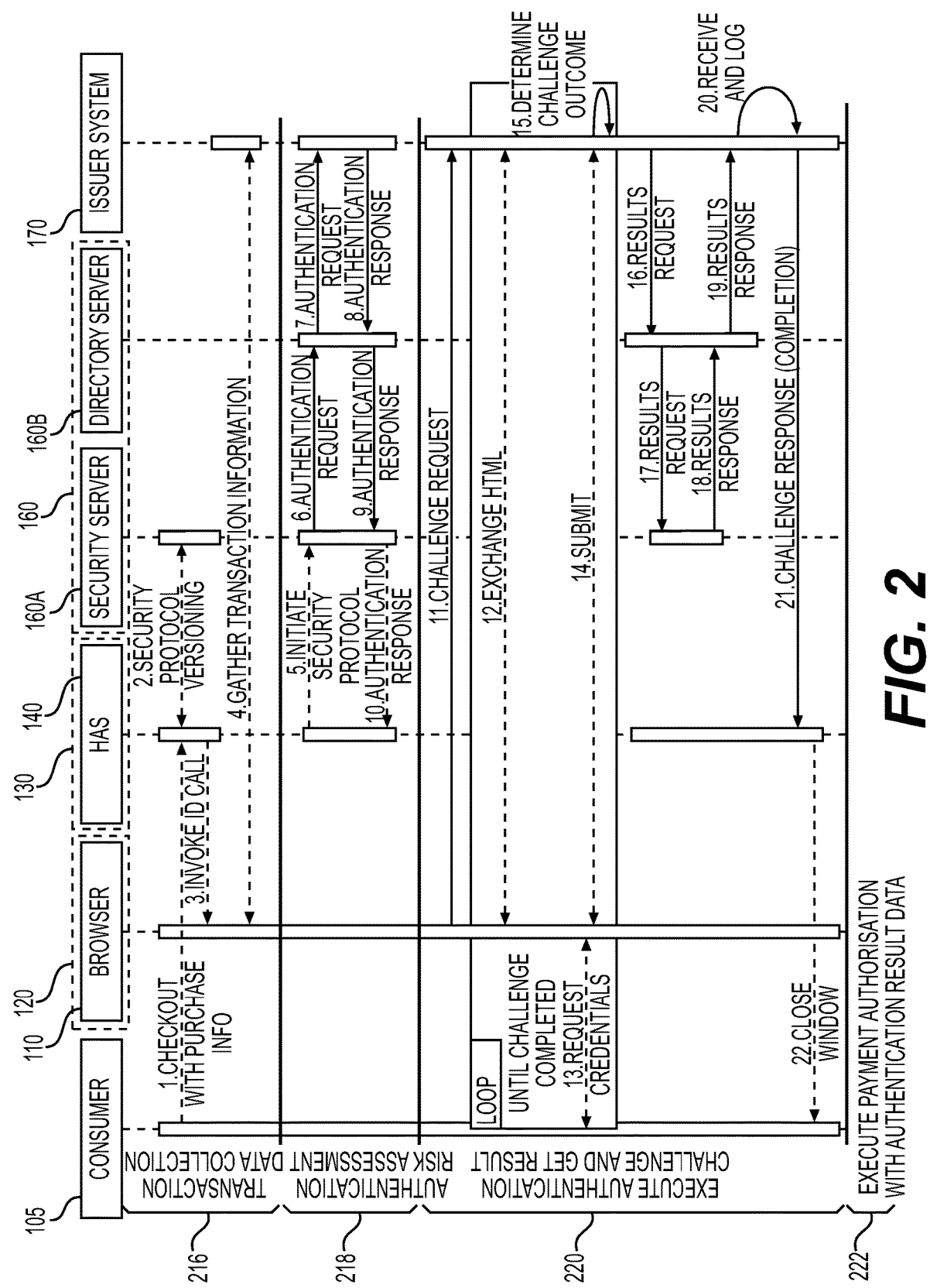
FIG. 2 depicts a flowchart illustrating an exemplary security protocol, according to one aspect of the present disclosure.

FIG. 2 shows a flowchart illustrating an exemplary security protocol requiring additional consumer payment transaction data as discussed above. The new security protocol may comprise a transaction data collection phase 216, an authentication risk assessment phase 218, an authentication challenge execution phase 220, and a payment authorization execution phase 222. During the transaction data collection phase 216, the consumer 105 may checkout with purchase information on a merchant website via the browser 110. The requestor system 130 (e.g., HAS 140 and/or requestor processor 150) may then send a security versioning request to a security server 160A (e.g., 3DS server). The security server 160A may then determine the supported security protocol version (e.g., 3DS1 or 3DS2) for the consumer 105 in accordance with the purchase information provided by the consumer 105. If the supported security protocol version is the new security protocol (e.g., 3DS2) that requires providing additional consumer transaction information to the issuer system 170, HAS 140 may gather and transmit the additional consumer transaction information to the issuer system 170 during the transaction data collection phase in order to proceed with the payment transaction process.

During the authentication risk assessment phase 218, the new security protocol may be initiated by HAS 140, and in response, the security server 160A may send an authentication request to the issuer system 170 by way of a directory server 160B, to receive an authentication response. Further, during the authentication challenge execution phase 220, the issuer system 170 may receive a challenge request and may request the consumer 105 to provide consumer credentials. The issuer system 170 may then transmit a result request to the security server 160A by way of the directory server 160B, and receive a result response from the security server 160A. Thereafter, during the payment authorization phase 222, the issuer system 170 may provide a challenge response to HAS 10 and may complete the payment transaction. In one embodiment, the authentication challenge execution phase 220 may be optional. That is, if the issuer system 170 determines that the consumer authentication challenge is not required, the authentication challenge execution phases 220 may not occur.

Referring back to FIG. 1, in order to provide the additional consumer payment transaction data as discussed above, the merchant system 120 may be required to re-integrate to the new security protocol (e.g., 3DS2) to process consumer payment transactions. However, instead of re-integrating the merchant system 120 to meet the new specification, HAS 140 may perform the additional consumer payment transaction data collection for the merchant system 120. HAS 140 may provide, for example, a hosted authentication page (or an embedded iframe), that mimics an existing security protocol authentication challenge page while undertaking the additional consumer transaction data collection (e.g., additional device data collection) as required by the new specification (e.g., 3DS2). HAS 140 may perform the above-described tasks before redirecting the consumer 105 to the challenge page of the issuer system 170 or responding to the acquirer system 180. HAS 140 may run JavaScript in the browser 110 to collect additional device data and send the collected data to the issuer system 170. As such, HAS 140 may provide backward compatibility with the existing protocol application programming interface (e.g., 3DS1 APIs). Further, HAS 140 may perform the hosted service even when JavaScript is disabled or not supported, and the functions of HAS 140 may be invisible to the consumers 105 during service.

Figure 3:
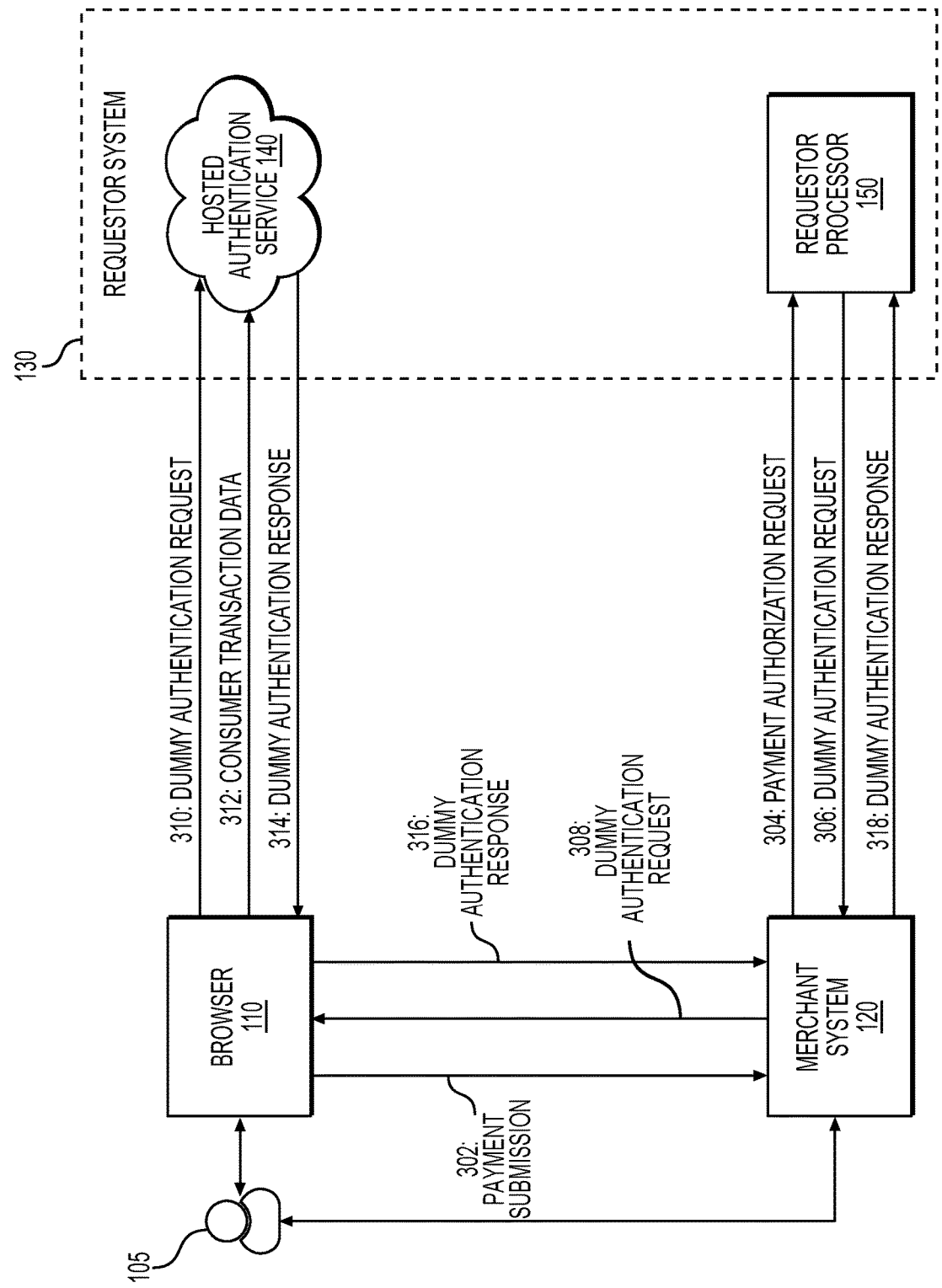
FIG. 3 depicts a block diagram of a portion of an exemplary electronic payment system performing an electronic payment transaction process utilizing a hosted authentication service, according to one aspect of the present disclosure.
Figure 4:
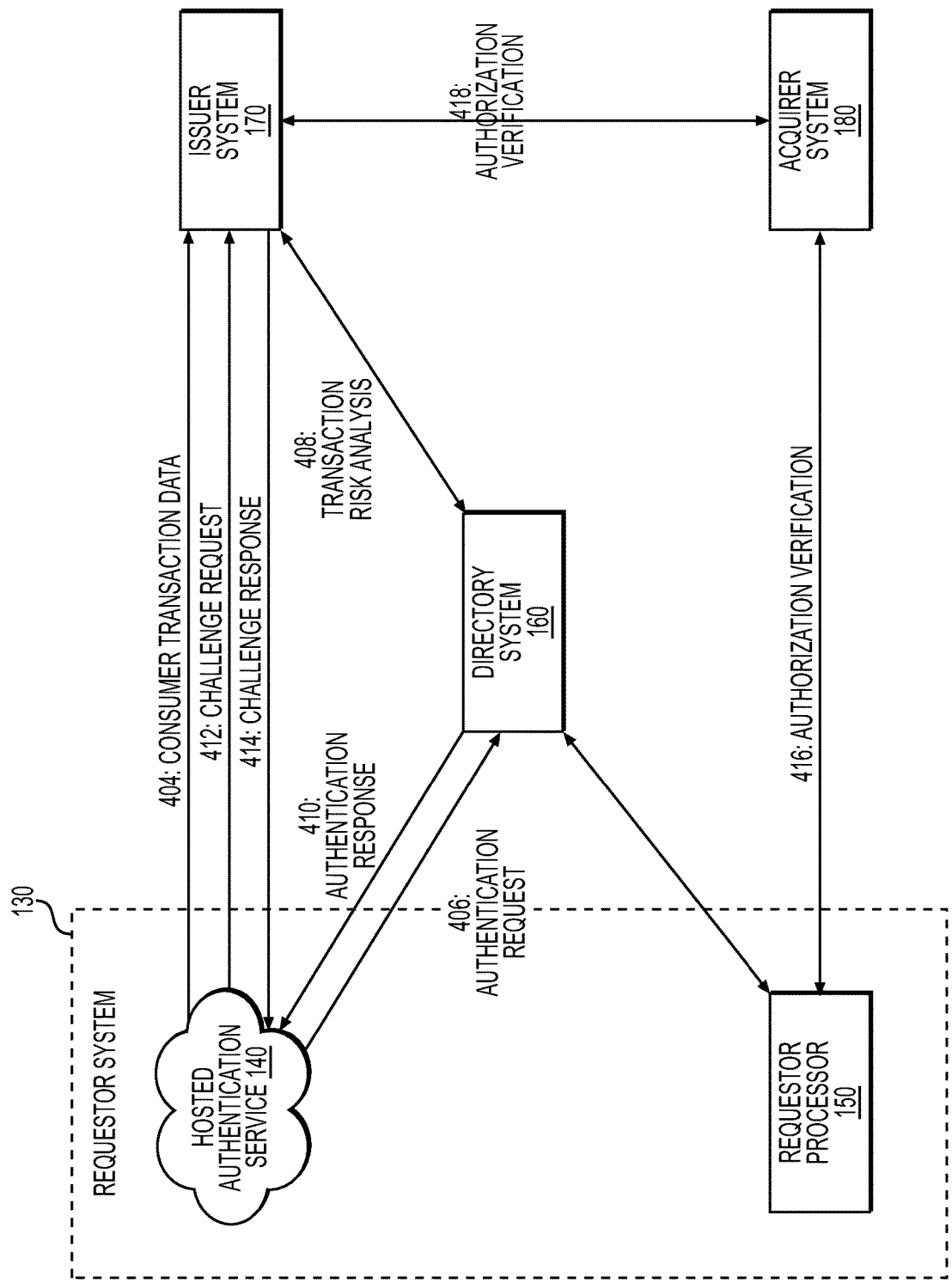
FIG. 4 depicts a block diagram of a portion of an exemplary electronic payment system performing an electronic payment transaction process utilizing a hosted authentication service, according to one aspect of the present disclosure.

FIGS. 3 and 4 are schematic block diagrams for exemplary embodiments of the electronic payment system 100 performing an electronic payment transaction process utilizing HAS 140. In the description below, reference will be made to both FIG. 3 and FIG. 4. According to an embodiment shown in FIG. 3, when the consumer 105 makes a purchase, the browser 110 may send a payment submission to the merchant system 120 at step 302. At step 304, the merchant system 120 may send a first message (e.g., a payment authorization request message) to the requestor processor 150. The requestor processor 150 may then determine whether a security assessment (or authentication) may be necessary (e.g., whether the payment is subject to a new specification, whether a blanket exemption applies, or whether the payment is considered low risk). For instance, as shown in FIG. 4, the requestor processor 150 may determine whether the authentication risk assessment phase 218 may be necessary. The requestor processor 150 may also determine whether a consumer challenge request is required based on a risk assessment determination. If the requestor processor 150 determines that a security assessment (or authentication) is not required (e.g., based on a blanket exemption or a predetermined merchant preference), the requestor processor 150 may skip the security assessment phase 218 shown in FIG. 2 and proceed to authorize the payment transaction with the acquirer system 180 at step 416.

However, referring back to FIG. 3, if the requestor processor 150 determines that the security assessment (or authentication) is required, the requestor processor 150 may respond to the payment request message from the merchant system 120 and transmit an authentication request and an issuer system URL at step 306. In this case, the issuer system URL may actually be a HAS URL. That is, as shown in FIG. 3, the authentication request generated by the requestor processor 150 may be a dummy authentication request that mimics the authentication request of the previous security protocol version (e.g., 3DS1). At step 308, the merchant system 120 may route the dummy authentication request to HAS 140 via the browser 140. Specifically, the merchant system 120 may generate an HTML form based on the HAS URL, and may include the merchant system return URL and the dummy authentication request in the HTML form (e.g., by POSTing to the HAS URL). At step 310, the HTML form with the dummy authentication request may land on a HAS end point. At step 312, HAS 140 may perform the consumer transaction data collection, as required by the new security protocol.

Referring back to FIG. 4, at step 404, HAS 140 may transmit the collected consumer transaction data to the issuer system 170. At step 406, HAS 140 may transmit an authentication request (e.g., a 3DS2 authentication request) to the issuer system 170, via the directory system 160, to determine whether the consumer authentication challenge is required. At step 408, the directory system 130 may also communicate with the issuer system 170 to perform a transaction risk analysis based on the collected consumer transaction data to confirm whether any exemptions may be applied. If the transaction risk analysis determines that no authentication is required for the payment transaction, the electronic payment transaction process may proceed to the payment transaction authorization stage. Otherwise, HAS 140 may perform the new authentication security protocol described in the security assessment phase 218 of FIG. 2 to determine whether the consumer authentication challenge is required.

At step 410, the directory system 160 may transmit an authentication response (e.g., 3DS2 authentication response) received from the issuer system 170 to HAS 140. If the issuer system 170 determines that the consumer authentication challenge is required, the directory system 160 may transmit the authentication response, which is generated from the issuer system 170, including information regarding a consumer authentication challenge request and an issuer system challenge URL. At step 412, HAS 140 may then generate an HTML form based on the issuer system challenge URL and may include the consumer authentication challenge request in the HTML form. The consumer 105 may then provide authentication credentials as required by the issuer system 170 (e.g., a password, a PIN, or a biometric authentication response) via the HTML form. The issuer system 170 may then inform the directory system 160 with a result request containing the result of the consumer authentication challenge. Upon successful completion of the authentication challenge execution phase 220, the issuer system 170 may generate a cryptogram that may be included in the result request. Thereafter, the directory system 160 may send a result response received from the issuer system 170 to HAS 140. At step 414, the issuer system 170 may generate an HTML form based on the HAS URL and may include a challenge response with information including the result of the consumer authentication challenge. HAS 140 may then generate an HTML form based on the merchant system URL and may include an authentication response. The authentication response may include a cryptogram generated by the issuer system 170. Referring back to FIG. 3, the authentication response may be transmitted to the browser 110 at step 314. The authentication response may be a dummy authentication response, which encompasses the authentication response and the result response received from the directory system 160, the challenge response received from the issuer system 170, and/or any transaction analysis exemption data generated in accordance with the new security protocol that are necessary to authorize the payment transaction.

At step 316, the merchant system 120 may receive the dummy authentication response from the browser 110. At step 318, the merchant system 120 may generate a second message including the dummy authentication response to the requestor processor 150, cross-referencing the original payment authorization request message with the second message including the dummy authentication response. The requestor processor 150 may then unpack the dummy authentication response to obtain the authentication response, result response, challenge response data, and any transaction analysis exemption data generated in accordance with the new security protocol. The requestor processor 150 may then perform an authorization verification process to complete the payment transaction with the acquirer system 180 at step 416 in FIG. 4. At step 418, the acquirer system 180 may perform the authorization verification by transmitting the necessary payment authentication data (e.g., cryptogram) received from the requestor processor 150 to the issuer system 170. The issuer system 170 may then validate the received payment authentication data and authorize the payment with an "authenticated" status.

The requestor processor 150 may then receive an authorization result and the authentication status data of the new security protocol from the acquirer system 180 and may respond to the second message received from the merchant system 120. In one embodiment, to maintain backward compatibility, the new security protocol authentication status values (e.g., 3DS2 values) may be mapped to the previous security protocol status values (e.g., 3DS1 values), and all of the new security protocol data can be provided via a portal or query application programming interfaces (APIs).

Figure 5:
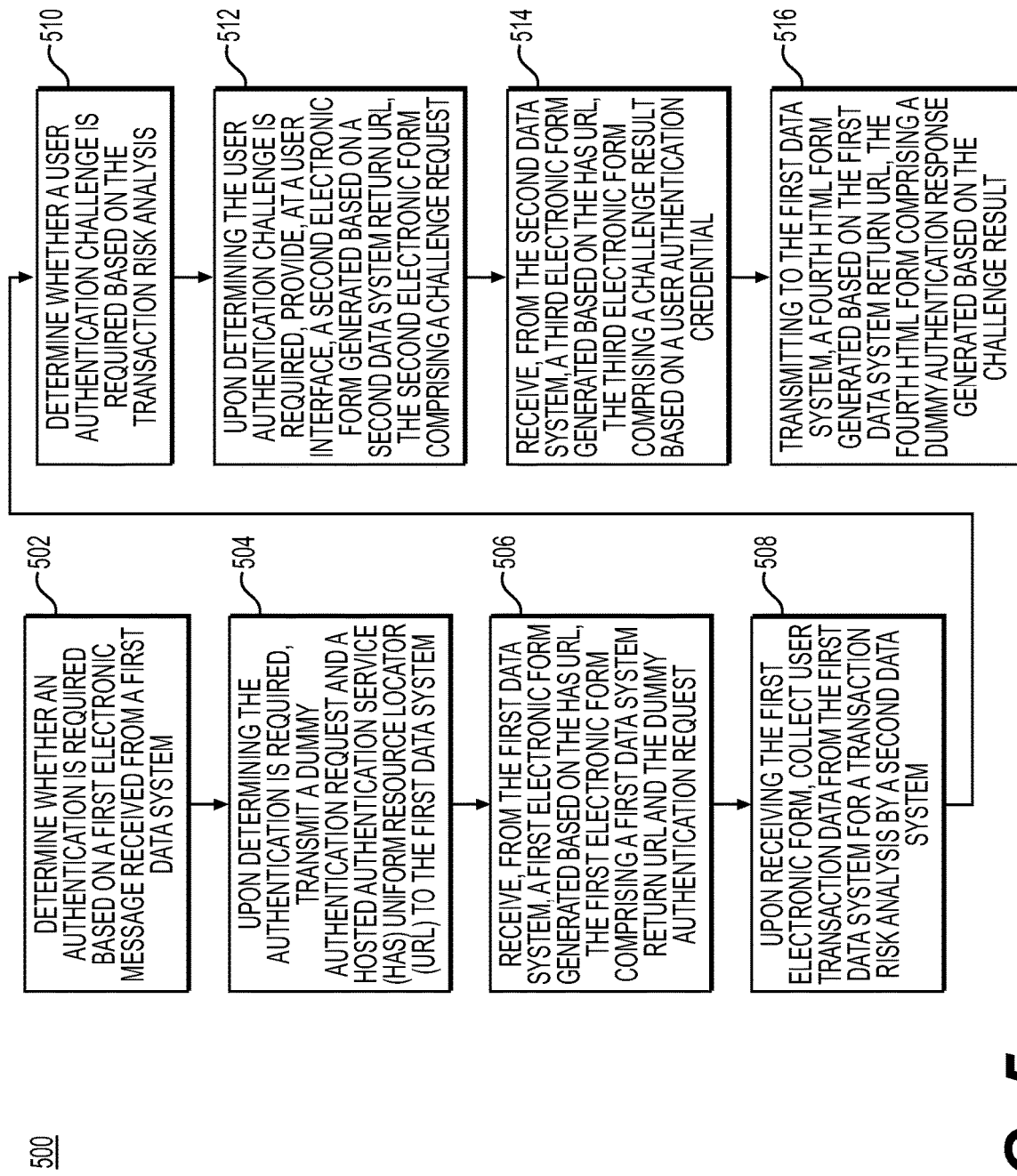
FIG. 5 depicts a flowchart of an exemplary method of authenticating consumer payment transaction, according to one aspect of the present disclosure.

FIG. 5 depicts a flowchart of an exemplary method of authenticating a consumer payment transaction, according to one aspect of the present disclosure. In particular, method 500 may be performed by the requestor system 130 (e.g., HAS 140 and the requestor processor 150 thereof).

At step 502, the requestor system 130 may determine whether a security assessment (or authentication) is required based on a first electronic message received from a first data system. The first electronic message may comprise a payment authorization request, and the first data system may comprise the merchant system 120. Whether the authentication is required may be based on the payment information received from the consumer 105, such as credit card information, and a version of security protocol that may support the payment transaction based on the payment information. At step 504, upon determining the authentication is required, the requestor system 130 may transmit a dummy authentication request and a hosted authentication service (HAS) uniform resource locator (URL) to the first data system. The dummy authentication request may be generated by the requestor system 130 to mimic a particular version (e.g., an earlier version) of security protocol that the merchant system 120 may be already integrated to support. The second data system may comprise a directory system, an issuer system, and/or an acquirer system. Upon determining the authentication is not required, the requestor system 130 may proceed to perform the transaction authorization process with the second system.

At step 506, the requestor system 130 may receive, from the first data system, a first electronic form generated based on the HAS URL, the first electronic form comprising a first data system return URL and the dummy authentication request. The first electronic form may be, for example, an HTML form or any other markup language form. At step 508, upon receiving the first electronic form, the requestor system 130 may collect user transaction data from the first data system for a transaction risk analysis by a second data system to confirm the authentication is not required. The second data system may be the issuer system 170. The user transaction data may comprise at least one of a user transaction history, a browser user agent, and a browser time zone. The requestor system 130 may run JavaScript in the browser 110 to collect the user transaction data. At step 510, the requestor system 130 may communicate with the second data system to determine whether a user authentication challenge is required based on the transaction risk analysis.

At step 512, upon determining the user authentication challenge is required, providing, at a user interface, a second electronic form generated based on a second data system return URL, the second electronic form comprising a challenge request. The second electronic form may be, for example an HTML form or any other markup language form. On the other hand, when determining the user authentication challenge is not required, the requestor system 130 may perform a frictionless authentication with the second data system. At step 514, the requestor system 130 may receive, from the second data system (e.g., the issuer system 170 and/or the directory system 160), a third electronic form generated based on the HAS URL, the third electronic form comprising a challenge result based on a user authentication credential. The third electronic form may be, for example, an HTML form or any other markup language form. The user authentication credential may comprise a password, a PIN, or a biometric authentication response received from the user. At step 516, the requestor system 130 may transmit, to the first data system, a fourth electronic form generated based on the first data system return URL, the fourth electronic form comprising a dummy authentication response generated based on the challenge result. The fourth electronic form may be, for example, an HTML form or any other markup language form.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

Figure 6:
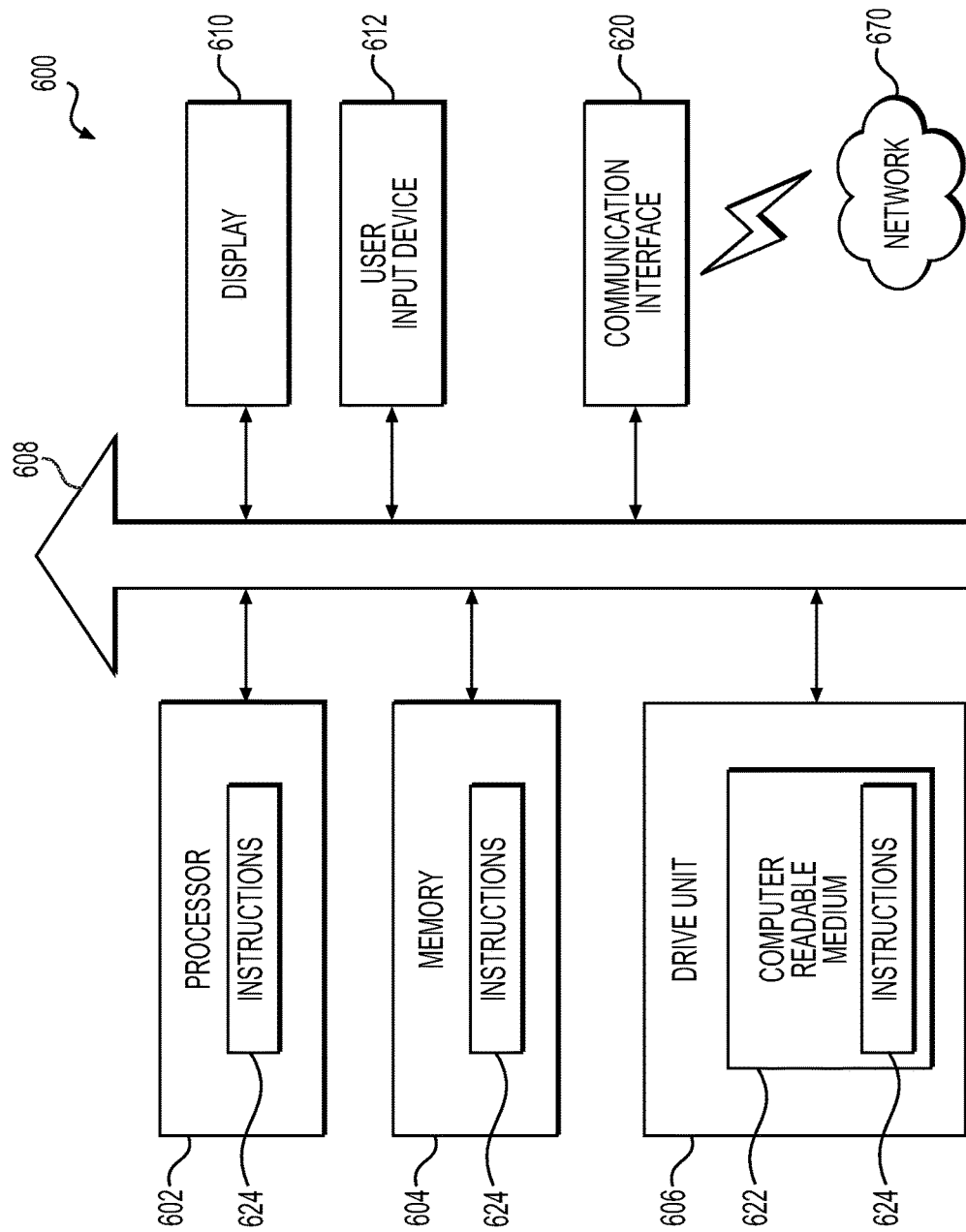
FIG. 6 illustrates a computer system that may execute the techniques described herein.

FIG. 6 illustrates a computer system designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system 600 may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 600 can be implemented using electronic devices that provide voice, video, or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The computer system 600 may include a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 604 includes a cache or random-access memory for the processor 602. In alternative implementations, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein may be performed by the programmed processor 602 executing the instructions stored in the memory 604. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 600 may further include a display unit 610, such as a liquid crystal display (LCD), an organic light emitting diode (OLED), a flat panel display, a solid-state display, a cathode ray tube (CRT), a projector, a printer or other now known or later developed display device for outputting determined information. The display 610 may act as an interface for the user to see the functioning of the processor 602, or specifically as an interface with the software stored in the memory 604 or in the drive unit 606.

Additionally or alternatively, the computer system 600 may include an input device 612 configured to allow a user to interact with any of the components of system 600. The input device 612 may be a number pad, a keyboard, or a cursor control device, such as a mouse, or a joystick, touch screen display, remote control, or any other device operative to interact with the computer system 600.

The computer system 600 may also or alternatively include a disk or optical drive unit 606. The disk drive unit 606 may include a computer-readable medium 622 in which one or more sets of instructions 624, e.g. software, can be embedded. Further, the instructions 624 may embody one or more of the methods or logic as described herein. The instructions 624 may reside completely or partially within the memory 604 and/or within the processor 602 during execution by the computer system 600. The memory 604 and the processor 602 also may include computer-readable media as discussed above.

In some systems, a computer-readable medium 622 includes instructions 624 or receives and executes instructions 624 responsive to a propagated signal so that a device connected to a network 670 can communicate voice, video, audio, images, or any other data over the network 670. Further, the instructions 624 may be transmitted or received over the network 670 via a communication port or interface 620, and/or using a bus 608. The communication port or interface 620 may be a part of the processor 602 or may be a separate component. The communication port 620 may be created in software or may be a physical connection in hardware. The communication port 620 may be configured to connect with a network 670, external media, the display 610, or any other components in system 600, or combinations thereof. The connection with the network 670 may be a physical connection, such as a wired Ethernet connection or may be established wirelessly as discussed below. Likewise, the additional connections with other components of the system 600 may be physical connections or may be established wirelessly. The network 670 may alternatively be directly connected to the bus 608.

While the computer-readable medium 622 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 622 may be non-transitory, and may be tangible.

The computer-readable medium 622 can include a solid-state memory such as a memory card or other package that houses one or more non-volatile read-only memories. The computer-readable medium 622 can be a random-access memory or other volatile re-writable memory. Additionally or alternatively, the computer-readable medium 622 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 600 may be connected to one or more networks 670. The network 670 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 670 may include wide area networks (WAN), such as the Internet, local area networks (LAN), campus area networks, metropolitan area networks, a direct connection such as through a Universal Serial Bus (USB) port, or any other networks that may allow for data communication. The network 670 may be configured to couple one computing device to another computing device to enable communication of data between the devices. The network 670 may generally be enabled to employ any form of machine-readable media for communicating information from one device to another. The network 670 may include communication methods by which information may travel between computing devices. The network 670 may be divided into sub-networks. The sub-networks may allow access to all of the other components connected thereto or the sub-networks may restrict access between the components. The network 670 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method comprising:
    determining, by one or more processors, a requirement of a security assessment for a request from a first system;
    transmitting, by the one or more processors, a dummy authentication request and a hosted authentication service (HAS) uniform resource locator (URL) to the first system;
    collecting, by the one or more processors, data from the first system for risk analysis based on a first electronic form;
    generating, by the one or more processors, a second electronic form upon determining a requirement of an authentication challenge based on the risk analysis;
    receiving, by the one or more processors, a third electronic form including a challenge result for the authentication challenge based on user authentication credentials; and
    generating, by the one or more processors, a fourth electronic form including a dummy authentication response.

2. The method of claim 1, wherein determining the requirement of the security assessment for the request comprises:
    receiving, by the one or more processors, the request for authorization of an electronic transaction from the first system; and
    processing, by the one or more processors, the request to determine the requirement of the security assessment for the request based on a security protocol of the electronic transaction.

3. The method of claim 2, wherein the security protocol includes multi-factor authentication, risk-based authentication, and frictionless authentication for requesting additional data.

4. The method of claim 1, wherein collecting the data from the first system for the risk analysis based on the first electronic form comprises:
    receiving, by the one or more processors, the first electronic form generated based on the HAS URL,
    wherein the first electronic form includes a first system return URL and the dummy authentication request.

5. The method of claim 1, wherein generating the second electronic form upon determining the requirement of the authentication challenge based on the risk analysis comprises:
    transmitting, by the one or more processors, the request and the collected data to a second system for determining the requirement of the authentication challenge, wherein the second system performs the risk analysis based on the collected data;
    receiving, by the one or more processors, a result of the risk analysis indicating the requirement of the authentication challenge from the second system, wherein the result includes an authentication challenge request and a second system challenge URL; and generating, by the one or more processors, the second electronic form based on the second system challenge URL.

6. The method of claim 5, wherein receiving the third electronic form including the challenge result for the authentication challenge based on the user authentication credentials comprises:
receiving, by the one or more processors, the challenge result from the second system upon successful completion of the authentication challenge, wherein the challenge result is an HTML form based on the HAS URL.

7. The method of claim 1, wherein the dummy authentication request mimics a previous security protocol, and wherein the dummy authentication request includes an authentication response, a result response, the challenge result from the second system, and/or transaction analysis exemption data per new security protocol to authorize an electronic transaction.

8. The method of claim 1, further comprising:
transmitting, by the one or more processors, the dummy authentication response to a second system, wherein the second system generates a second message including the dummy authentication response;
cross-referencing, by the one or more processors, the request with the second message including the dummy authentication response;
unpacking, by the one or more processors, the dummy authentication response to obtain an authentication response, a result response, the challenge result, and/or a transaction analysis exemption data; and
performing, by the one or more processors, an authorization verification to authorize an electronic transaction.

9. The method of claim 8, wherein performing the authorization verification comprises:
transmitting, by the one or more processors, an authentication data for the electronic transaction to the second system, wherein the second system validates the authentication data and authorizes the electronic transaction; and
receiving, by the one or more processors, an authorization result and authentication status data of a new security protocol from the second system.

10. The method of claim 8, wherein the authentication data includes a cryptogram.

11. A system comprising:
one or more processors of a computing system; and
at least one non-transitory computer readable medium storing instructions which, when executed by the one or more processors, cause the one or more processors to perform operations comprising:
determining a requirement of a security assessment for a request from a first system;
transmitting a dummy authentication request and a hosted authentication service (HAS) uniform resource locator (URL) to the first system;
collecting data from the first system for risk analysis based on a first electronic form;
generating a second electronic form upon determining a requirement of an authentication challenge based on the risk analysis;
receiving a third electronic form including a challenge result for the authentication challenge based on user authentication credentials; and
generating a fourth electronic form including a dummy authentication response.

12. The system of claim 11, wherein determining the requirement of the security assessment for the request comprises:
receiving the request for authorization of an electronic transaction from the first system; and
processing the request to determine the requirement of the security assessment for the request based on a security protocol of the electronic transaction.

13. The system of claim 12, wherein the security protocol includes multi-factor authentication, risk-based authentication, and frictionless authentication for requesting additional data.

14. The system of claim 11, wherein collecting the data from the first system for the risk analysis based on the first electronic form comprises:
receiving the first electronic form generated based on the HAS URL,
wherein the first electronic form includes a first system return URL and the dummy authentication request.

15. The system of claim 11, wherein generating the second electronic form upon determining the requirement of the authentication challenge based on the risk analysis comprises:
transmitting the request and the collected data to a second system for determining the requirement of the authentication challenge, wherein the second system performs the risk analysis based on the collected data;
receiving a result of the risk analysis indicating the requirement of the authentication challenge from the second system, wherein the result includes an authentication challenge request and a second system challenge URL; and
generating the second electronic form based on the second system challenge URL.

16. The system of claim 15, wherein receiving the third electronic form including the challenge result for the authentication challenge based on the user authentication credentials comprises:
receiving the challenge result from the second system upon successful completion of the authentication challenge, wherein the challenge result is an HTML form based on the HAS URL.

17. The system of claim 11, wherein the dummy authentication request mimics a previous security protocol, and wherein the dummy authentication request includes an authentication response, a result response, the challenge result from the second system, and/or transaction analysis exemption data per new security protocol to authorize an electronic transaction.

18. A non-transitory computer readable medium, the non-transitory computer readable medium storing instructions which, when executed by one or more processors of a computing system, cause the one or more processors to perform operations comprising:
determining a requirement of a security assessment for a request from a first system;
transmitting a dummy authentication request and a hosted authentication service (HAS) uniform resource locator (URL) to the first system;
collecting data from the first system for risk analysis based on a first electronic form;
generating a second electronic form upon determining a requirement of an authentication challenge based on the risk analysis;
receiving a third electronic form including a challenge result for the authentication challenge based on user authentication credentials; and generating a fourth electronic form including a dummy authentication response.

19. The non-transitory computer readable medium of claim 18, wherein collecting the data from the first system for the risk analysis based on the first electronic form comprises:
- receiving the first electronic form generated based on the HAS URL,
- wherein the first electronic form includes a first system return URL and the dummy authentication request.

20. The non-transitory computer readable medium of claim 18, wherein generating the second electronic form upon determining the requirement of the authentication challenge based on the risk analysis comprises:
- transmitting the request and the collected data to a second system for determining the requirement of the authentication challenge, wherein the second system performs the risk analysis based on the collected data;
- receiving a result of the risk analysis indicating the requirement of the authentication challenge from the second system, wherein the result includes an authentication challenge request and a second system challenge URL;
- generating the second electronic form based on the second system challenge URL; and
- receiving the challenge result from the second system upon successful completion of the authentication challenge, wherein the challenge result is an HTML form based on the HAS URL.

* * * * *